June 12, 1956  J. B. JAMIESON ET AL  2,749,950
INSERT TOOTH FOR POWER SAW CHAIN
Filed Nov. 14, 1951  2 Sheets-Sheet 1

INVENTORS
JACK B. JAMIESON
JOHN A. LONG
BY
ATTORNEY

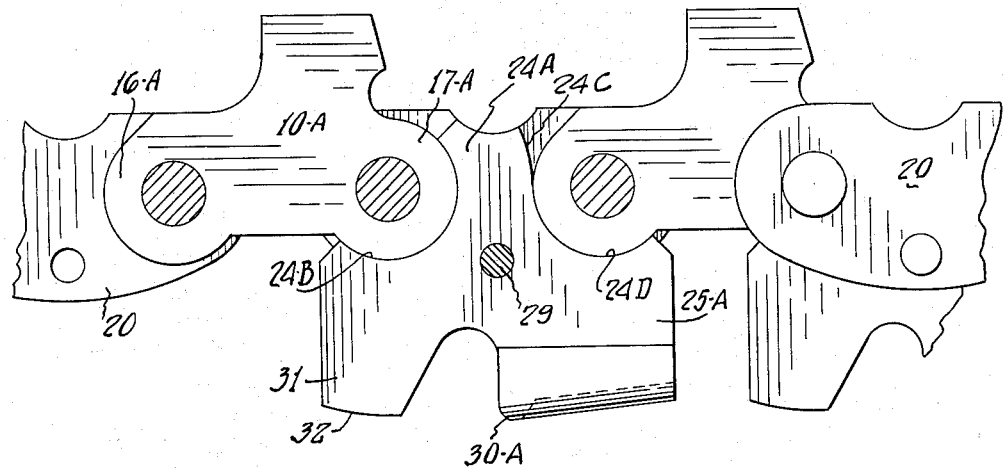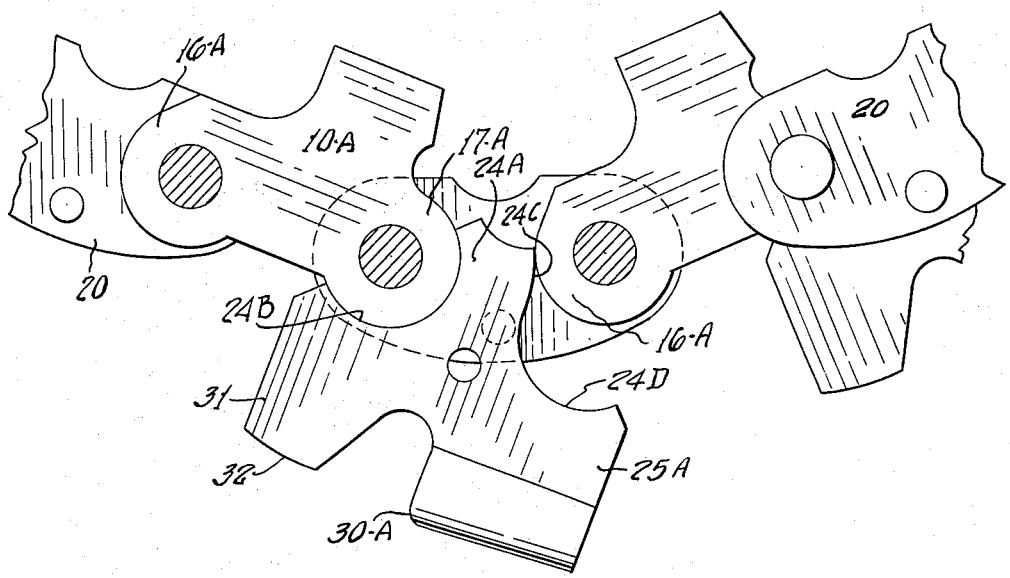

United States Patent Office 2,749,950
Patented June 12, 1956

2,749,950

INSERT TOOTH FOR POWER SAW CHAIN

Jack B. Jamieson and John A. Long, Lebanon, Oreg., assignors to Jamieson Saw Chain, Inc., a corporation of Oregon Application November 14, 1951, Serial No. 256,192

4 Claims. (Cl. 143—135)

This invention relates generally to power saws of the chain type and particularly to an improved insert tooth therefor.

The main object of this invention is to provide an insert for saw chains which cannot be released while the chain is in a running position.

The second object is to so construct the chain and tooth inserts that they can be readily replaced or inserted by merely driving out a single rivet and bending the chain on a radius shorter than any radius it follows during its working travel.

The third object is to reduce to a minimum the working stress on the holding rivet.

We accomplish these and other objects in the manner set forth in the following specification as illustrated in the accompanying drawings, in which:

Fig. 5 is a fragmentary perspective view of a modified form of chain in which the tooth can be inserted or withdrawn by a rolling action of the insert showing the parts in a straight line or working condition with the rivet in place.

Fig. 6 is a view similar to Fig. 5 but showing the parts in a curved position with the rivet removed.

Like numbers of reference refer to the same or similar parts throughout the several views.

Figure 2:
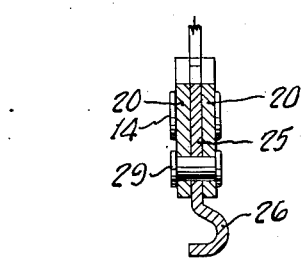
Fig. 2 is a section taken along the line 2—2 in Fig. 1.
Figure 1:
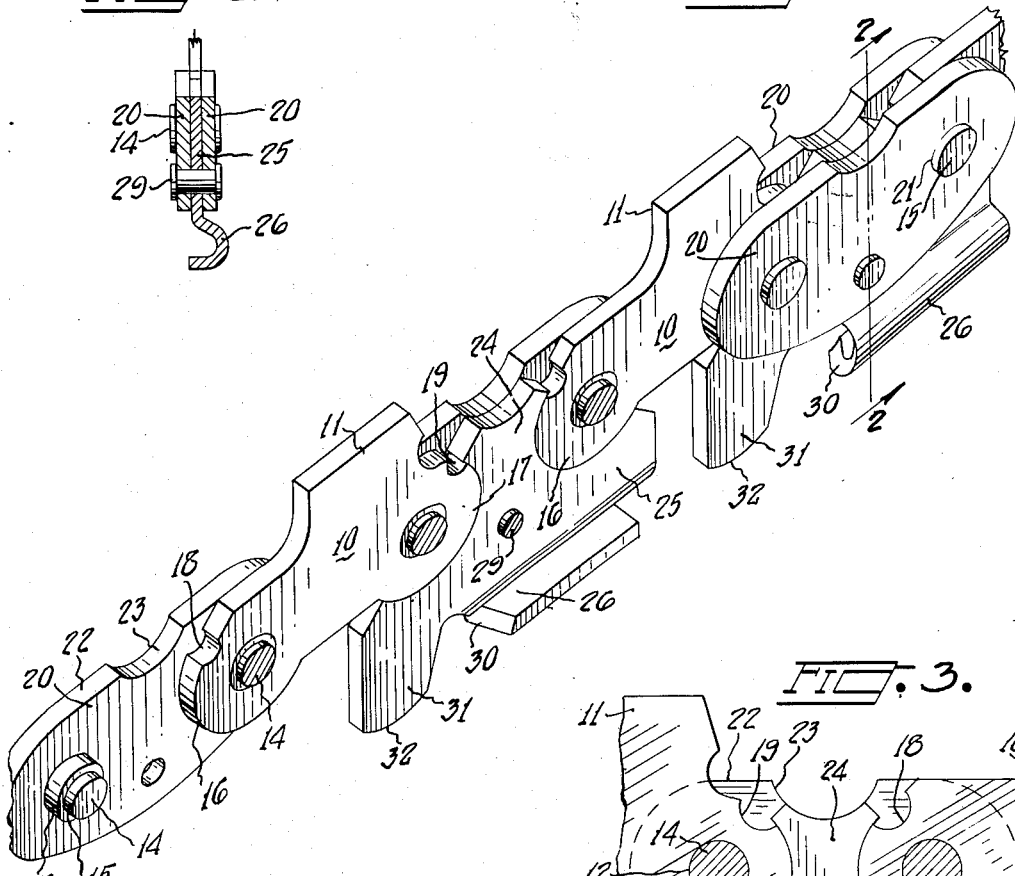
Fig. 1 is a fragmentary perspective view of a chain showing the preferred form of insert.

Referring in detail to the drawings there is shown in Figs. 1 to 4 a short section of chain comprised of a center row of block links 10 on which is formed a shank 11 which is slidable in the saw frame groove (not shown). Each block link 10 is provided with a large rivet hole 12 at each end thereof for the body 13 of the shouldered rivet 14 whose ends 15 are reduced in diameter. The ends 16 and 17 of the links 10 are rounded and provided with notches 18 and 19, the purpose of which will be explained later.

Side links 20 are disposed on opposite sides of the links 10 and have rivet holes 21, which receive the reduced ends 15 of the rivet 14. The links 20 have the middle of their saw frame engaging sides 22 cut away along the curve 23.

The pitch distance between the rivets 14 is long enough and the radii of the ends 16 and 17 are short enough to provide clearance for a double concave shank 24 of the insert teeth 25 whose cutting portion 26 is curved as shown in Fig. 2.

Figure 3:
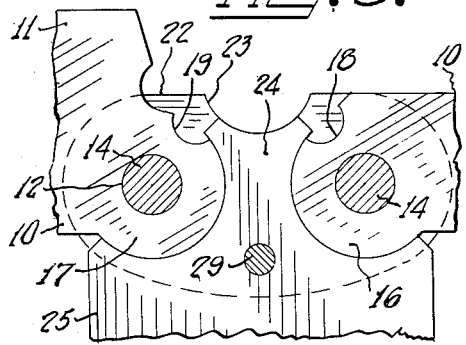
Fig. 3 is a fragmentary front elevation showing a pair of side links and the ends of an adjacent pair of block links between which the insert is held in a straight line or working condition.

The curves 27 and 28 of the teeth 25 conform to the curved ends 16 and 17 when the parts are in the position shown in Fig. 3, at which time a rivet 29 passes through the shank 24 and both side links 20.

Figure 4:
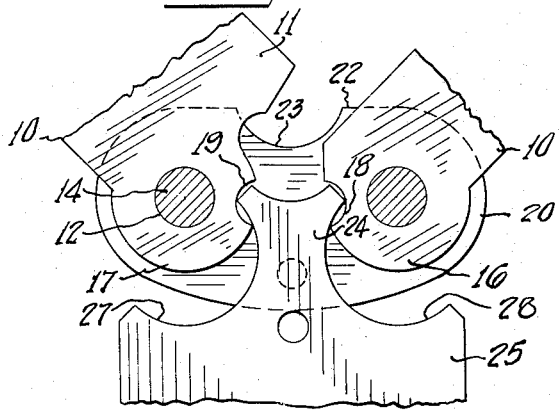
Fig. 4 is similar to Fig. 3 but showing the block links bent to allow the insert to be inserted or withdrawn.

It will be noted in Fig. 4 that as an adjacent pair of links 10 are swung toward each other; that is, assume a curve smaller than is made by the chain in its travel around the frame that the insert can be withdrawn as the links 10 approach each other, but this bending of the chain cannot be performed until the rivet 29 is removed. It will be noted that in this form of the chain, the cutting load is on the center links, thereby eliminating many of the distorting stresses commonly placed on a saw chain of this type.

The cutting end 30 is filed with a round file inclined to the line of the cut as set forth in detail in our application, Serial No. 211,552, filed February 17, 1951, over which the device described herein is an improvement.

In the form of the device illustrated in Figs. 5 and 6, the parts are the same as those described in Figs. 1 to 4 with certain exceptions.

It will be seen in Figs. 5 and 6 that the block links 10–A do not have notches formed in their ends 16–A and 17–A and that the shank 24–A has a semi-circular opening 24–B on one side, which conforms to the end 17–A, while its edge 24–C is concentric with the opening 24–B or convex while the portion 24–D is concave and conforms to the shape of the end 16–A. The same holding rivet 29 is employed as in the first described form of the device. A shank 11–A is formed on each block link 10–A and slides in a saw bar (not shown).

The gauging shoe 31 is placed in advance of the cutting portion 26 and its edge 32 rides on the bottom of the saw cut.

In the last described form of the device, as illustrated in Figs. 5 and 6, the removal of the tooth 25–A is accomplished by driving out the rivet 29 and then rolling the tooth 25–A on the rounded end 17–A, as shown in Fig. 6. To mount the insert in the chain, as shown in Fig. 5, the operation is reversed; that is, the tooth 25–A is rolled into position while the parts are in the position shown in Fig. 6 and the rivet 29 inserted and the chain straightened out.

Since the cutting action is against the edge 30–A then the trailing end of the tooth 25–A is held against the following end 16–A and it is impossible for the tooth 25–A to become dislodged. The rivet 29 is subjected to little, if any, wear or stress.

We claim:

1. A power saw chain having in combination block links and side links joined by rivets, the ends of whose block links are concentric with their connecting rivets and spaced from each other, an insert tooth having a curved shank occupying the space between the ends of a pair of block links, the edges of said shank being concentric with the leading adjacent rivet, each insert tooth having a gauging shoe at its leading end and a cutter bit formed on its trailing end, said cutter bit having its cutting edge near the middle of the length of said insert and opposite said curved shank, said side links and insert tooth having pin holes formed therein registering when said insert is in a working position, and a rivet pin occupying said pin holes.

2. A power saw chain having in combination block links hingedly joined by rivets to pairs of side links, the ends of said block links having convexly curved portions concentric with their connecting rivets and being spaced longitudinally from each other, a removable insert tooth having a shank with curved concaved edges projecting into and occupying said space between said block links, the curved concaved edges of the shank coinciding substantially with the curved convexed edges of said block links, each insert tooth having a depth regulating shoe at its leading end and a cutter bit formed on its trailing end, said cutter bit having its cutting end spaced from the shoe and below said curved shank, said side links and insert tooth having rivet holes formed therein registering when said insert is in a working position, and a rivet occupying said holes.

3. A power saw chain having in combination block links and side links joined by rivets, the ends of whose block links are concentric with their connecting rivets and spaced from each other, an insert tooth having a curved shank occupying the space between the ends of a pair of block links, the edges of said shank being concentric with the leading adjacent rivet and having means cooperable with means on the ends of the block links to effect removal of said insert tooth when the chain is flexed, each insert tooth having a gauging shoe at its leading end and a cutter bit formed on its trailing end, said cutter bit having its cutting edge near the middle of the length of said insert and opposite said curved shank, said side links and insert tooth having pin holes formed therein registering when said insert is in a working position, and a rivet pin occupying said pin holes.

4. The power saw chain of claim 3, wherein the means on the shank of said insert tooth comprise protruding edges and the means on the block links comprise notches adapted to key over the edges when the chain is flexed over a small radius.

References Cited in the file of this patent

UNITED STATES PATENTS

| | | |
|---|---|---|
| 973,686 | Morgan et al. | Oct. 25, 1910 |
| 1,961,370 | Lee | June 5, 1934 |
| 2,174,815 | Baugh | Oct. 3, 1939 |
| 2,344,750 | Stoltz | Mar. 21, 1944 |
| 2,354,781 | Stoltz | Aug. 1, 1944 |
| 2,508,784 | Cox | May 23, 1950 |
| 2,622,636 | Cox | Dec. 23, 1952 |

FOREIGN PATENTS

| | | |
|---|---|---|
| 29,213 | Great Britain | Dec. 16, 1910 |